United States Patent
Azeredo

(10) Patent No.: US 11,155,352 B2
(45) Date of Patent: Oct. 26, 2021

(54) AIRCRAFT MOUNTED HOIST SYSTEM HAVING A MULTI-STRANDED WIRE ROPE CABLE

(71) Applicant: Breeze-Eastern LLC, Whippany, NJ (US)

(72) Inventor: Ian Azeredo, Whippany, NJ (US)

(73) Assignee: BREEZE-EASTERN LLC, Whippany, NJ (US)

( * ) Notice: Subject to any disclaimer, the term of this patent is extended or adjusted under 35 U.S.C. 154(b) by 676 days.

(21) Appl. No.: 16/108,273

(22) Filed: Aug. 22, 2018

(65) Prior Publication Data
US 2019/0061943 A1 Feb. 28, 2019

Related U.S. Application Data

(60) Provisional application No. 62/548,594, filed on Aug. 22, 2017.

(51) Int. Cl.
*B64D 1/22* (2006.01)
*B66D 1/30* (2006.01)
(Continued)

(52) U.S. Cl.
CPC .............. *B64D 1/22* (2013.01); *B66D 1/00* (2013.01); *B66D 1/30* (2013.01); *B66D 1/34* (2013.01); *B66D 1/36* (2013.01); *D07B 1/0673* (2013.01); *D07B 1/0686* (2013.01); *B64C 1/22* (2013.01); *B64D 9/00* (2013.01); *B66D 2700/0191* (2013.01); *D07B 1/148* (2013.01);
(Continued)

(58) Field of Classification Search
CPC .... D07B 1/0673; D07B 1/0686; D07B 1/148; D07B 5/007; D07B 2201/102; D07B 2205/3028; D07B 2801/24; D07B 2801/14; B66D 1/00; B66D 1/30; B66D 1/34; B66D 1/36; B66D 2700/0191; B64C 1/22; B66B 7/06
See application file for complete search history.

(56) References Cited

U.S. PATENT DOCUMENTS 1,183,487 A * 5/1916 Parker .................... D07B 1/068
57/219
3,822,542 A * 7/1974 Naud ..................... D07B 7/027
57/215
(Continued)

FOREIGN PATENT DOCUMENTS

EP 2441723 A1 4/2012
GB 1557391 A 12/1979

OTHER PUBLICATIONS

International Search Report and Written Opinion issued in PCT/US2018/047430, dated Oct. 18, 2018.

*Primary Examiner* — Michael E Gallion
(74) *Attorney, Agent, or Firm* — BakerHostetler

(57) ABSTRACT

A hoist system includes a wire rope cable having a first end and a second end. The wire rope cable further including multiple strands twisted into a helical shape. The hoist system further including a lifting mechanism configured to attach to the first end of the wire rope cable. The lifting mechanism including at least one of a rotating drum and a set of frictional rollers. The hoist system further including a motor configured to rotate the lifting mechanism; and a housing configured to house the lifting mechanism, the motor, and at least part of the wire rope cable.

18 Claims, 8 Drawing Sheets

(51) Int. Cl.
  B66D 1/36 (2006.01)
  D07B 1/06 (2006.01)
  B66D 1/00 (2006.01)
  B66D 1/34 (2006.01)
  B64D 9/00 (2006.01)
  B64C 1/22 (2006.01)
  D07B 5/00 (2006.01)
  D07B 1/14 (2006.01)

(52) U.S. Cl.
  CPC ........ *D07B 5/007* (2013.01); *D07B 2201/102* (2013.01); *D07B 2201/204* (2013.01); *D07B 2201/2009* (2013.01); *D07B 2201/2037* (2013.01); *D07B 2201/2053* (2013.01); *D07B 2201/2055* (2013.01); *D07B 2201/2059* (2013.01); *D07B 2205/3028* (2013.01)

(56) References Cited

U.S. PATENT DOCUMENTS

| | | | | |
|---|---|---|---|---|
| 5,797,254 A * | 8/1998 | Walton | ................ | D07B 1/0686 57/220 |
| 5,988,596 A * | 11/1999 | Mitchell | ................ | B66D 1/36 254/271 |
| 7,913,978 B1 * | 3/2011 | Trihey | ................ | B66D 3/006 254/323 |
| 9,162,849 B2 * | 10/2015 | Mitsui | ................ | D07B 1/068 |
| 9,506,188 B2 * | 11/2016 | Pourladian | ................ | D07B 1/0686 |
| 9,896,307 B2 * | 2/2018 | Mitsui | ................ | B66B 9/00 |
| 9,902,594 B2 * | 2/2018 | Mitsui | ................ | D07B 1/04 |
| 10,023,312 B2 * | 7/2018 | Repp | ................ | B66C 1/40 |
| 10,851,493 B2 * | 12/2020 | Watanabe | ................ | D07B 1/005 |
| 2003/0206419 A1 * | 11/2003 | Longatti | ................ | D04C 1/12 362/551 |
| 2009/0078922 A1 * | 3/2009 | Kempf | ................ | D07B 1/148 254/266 |
| 2013/0227926 A1 * | 9/2013 | Amils | ................ | D07B 1/068 57/218 |
| 2013/0318937 A1 * | 12/2013 | Takeuchi | ................ | D07B 5/007 57/220 |
| 2014/0070153 A1 * | 3/2014 | Lin | ................ | G01L 5/103 254/323 |
| 2017/0138880 A1 * | 5/2017 | Veronesi | ................ | D07B 1/145 |
| 2018/0195917 A1 * | 7/2018 | Carini | ................ | B64D 1/22 |
| 2018/0362300 A1 * | 12/2018 | Mitsui | ................ | B66B 7/06 |
| 2019/0263642 A1 * | 8/2019 | Hainsworth | ................ | B64D 25/02 |
| 2020/0115201 A1 * | 4/2020 | Maghsoodi | ................ | B66D 1/36 |

* cited by examiner

AIRCRAFT MOUNTED HOIST SYSTEM HAVING A MULTI-STRANDED WIRE ROPE CABLE

CROSS-REFERENCE TO RELATED APPLICATIONS

This application claims the benefit of U.S. Provisional Application No. 62/548,594 filed on Aug. 22, 2017, which is hereby incorporated by reference in its entirety for all purposes as if fully set forth herein.

FIELD OF THE DISCLOSURE

The disclosure relates to an aircraft mounted hoist system having a wire rope cable. More particularly, the disclosure relates to an aircraft mounted hoist system having a multi-stranded wire rope cable.

BACKGROUND OF THE DISCLOSURE

Existing hoists installed on rotorcraft typically use a cable design called the 19×7, which is classified as an IWRC (independent wire rope core) cable and primarily defined through military specifications (MIL-DTL-83140). The 19×7 is called such because it includes 19 strands with 7 wires per strand. Additionally, 7 strands make up the interior wire rope core, surrounded by a sheath of 12 strands. The existing 19×7 cable by design possesses a few risks: 1. The cable is prone to a condition called "looseness" which is caused by an unbalancing between an inner core and outer strands of the cable. Hoisting from helicopters can be a particularly chaotic operation, and so it is common for cables to develop looseness over a short duration of usage especially depending on handling and operational considerations; 2. The inner strands of the cable slide against the outer strands, posing analytical safety considerations since the interior of most small diameter wire rope cables cannot be inspected reliably using modern technology, and most installations define airworthiness as zero-flaw; and 3. The cable strength becomes significantly lower when one end features a rotational swivel. For operational reasons, most rescue hoists include a swivel between the hook and the wire rope cable in order to allow management of personnel or cargo beneath the rotorcraft.

In this regard, there is a growing concern in the helicopter community concerning rescue hoists. The major logistic and technical problems concern the existing wire rope cable designs. As hoists have evolved over time, existing wire rope designs (as used on rotorcraft mounted hoists) have reached a practical limitation and have become a safety consideration, as well as a maintenance burden.

Accordingly, what is needed is a hoist system having wire rope cable that is safer and requires less maintenance.

SUMMARY OF THE DISCLOSURE

The foregoing needs are met, to a great extent, by the disclosure, wherein in one aspect a hoist system includes a wire rope cable that is safer and requires less maintenance.

The disclosed system may be installed on all types of aircraft, such as rotorcraft, and used for personnel rescue, cargo lifting operations, and the like, which incorporate a steel, stainless steel, galvanized steel, or like wire rope cable constructed from four major strand assemblies of wire which are mechanically compacted into a partially circular cross section.

When installed on a helicopter, the hoist system allows raising and lowering of a load beneath the helicopter and into the helicopter cabin. The lifting mechanism may be a rotating drum, a set of frictional rollers, and/or the like connected to a length of the four-stranded wire rope cable, which may be terminated at its lower end to a hook.

The disclosed system may incorporate the use of a four-stranded wire rope cable. The cable may be compacted into a partially circular cross section. A strand is considered a bundle of circular, oval, or polygonal shaped wires of various diameters arranged in a circular pattern, and twisted in a helical shape. Four separate strands of equal configuration are twisted into a larger cable assembly. This larger cable assembly may be mechanically compacted into a mostly circular cross section. The wire rope cable may contain a non-metallic core for non-structural assembly purposes, or for additional structural considerations.

The four-stranded wire rope cable may be connected on one end to a hoist mechanism, with the other end connected using a permanent termination on the wire rope cable to a hook assembly. Various types of cable terminations may include the use of mechanically swaged end fittings, spliced fittings, knotted terminations, welded terminations, and the like.

The disclosure involves the non-standard use of the four-stranded cable within a rotorcraft mounted hoist system. The disclosure further includes special manufacturing techniques which may by incorporated for finishing and adapting for use the wire rope on a hoist system as intended for installation on rotorcraft.

In accordance with one aspect, a hoist system includes a wire rope cable having a first end and a second end; the wire rope cable further including multiple strands twisted into a helical shape; a lifting mechanism configured to attach to the first end of the wire rope cable; the lifting mechanism including at least one of a rotating drum and a set of frictional rollers; a motor configured to rotate the lifting mechanism; and a housing configured to house the lifting mechanism, the motor, and at least part of the wire rope cable.

In accordance with another aspect, a hoist system includes a wire rope cable having a first end and a second end; the wire rope cable further including multiple strands twisted into a helical shape; a lifting mechanism configured to attach to the first end of the wire rope cable; the lifting mechanism including at least one of a rotating drum and a set of frictional rollers; a motor configured to rotate the lifting mechanism; and a housing configured to house the lifting mechanism, the motor, and at least part of the wire rope cable, wherein the multiple strands include four strands, wherein the wire rope cable further includes a plastic core, and wherein the multiple strands include steel.

One general aspect includes a hoist system, including: a wire rope cable having a first end and a second end; the wire rope cable further including a core; the wire rope cable further including multiple strands twisted into a helical shape around the core such that the multiple strands form an external surface of the wire rope cable and also contact the core; a lifting mechanism configured to attach to the first end of the wire rope cable; the lifting mechanism including at least one of a rotating drum and a set of frictional rollers; a motor configured to rotate the lifting mechanism; and a housing configured to house the lifting mechanism, the motor, and at least part of the wire rope cable.

Implementations may include one or more of the following features. The hoist system where the multiple strands include four strands. The hoist system where the multiple strands include steel. The hoist system where the multiple strands include AISI 304 corrosion resistant steel. The hoist system where each strand includes nine outer wires. The hoist system where each strand includes nine inner wires. The hoist system where each strand includes a single central wire. The hoist system where the multiple strands include AISI 302 corrosion resistant steel. The hoist system where the wire rope cable further includes a marked a portion including at least one of the following: a painted portion, a coated portion, an etched portion, or a dyed portion. The hoist system may also include where the multiple strands include four strands; where the multiple strands include steel, where each strand includes nine outer wires, where each strand includes nine inner wires, and where each strand includes a single central wire.

One general aspect includes a hoist system, including: a wire rope cable having a first end and a second end; the wire rope cable further including a core that includes a synthetic material; the wire rope cable further including multiple strands twisted into a helical shape around the core such that the multiple strands form an external surface of the wire rope cable and also contact the core; a lifting mechanism configured to attach to the first end of the wire rope cable; the lifting mechanism including at least one of a rotating drum and a set of frictional rollers; a motor configured to rotate the lifting mechanism; and a housing configured to house the lifting mechanism, the motor, and at least part of the wire rope cable.

Implementations may include one or more of the following features. The hoist system where the multiple strands include four strands. The hoist system where the multiple strands include steel. The hoist system where the multiple strands include AISI 304 corrosion resistant steel. The hoist system where each strand includes nine outer wires. The hoist system where each strand includes nine inner wires. The hoist system where each strand includes a single central wire. The hoist system where the multiple strands include AISI 302 corrosion resistant steel. The hoist system where the wire rope cable further includes a marked a portion including at least one of the following: a painted portion, a coated portion, an etched portion, or a dyed portion. The hoist system may also include where the multiple strands include four strands.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the disclosure. It is important, therefore, that the claims be regarded as including such equivalent constructions insofar as they do not depart from the spirit and scope of the disclosure.

DETAILED DESCRIPTION

Figure 1:
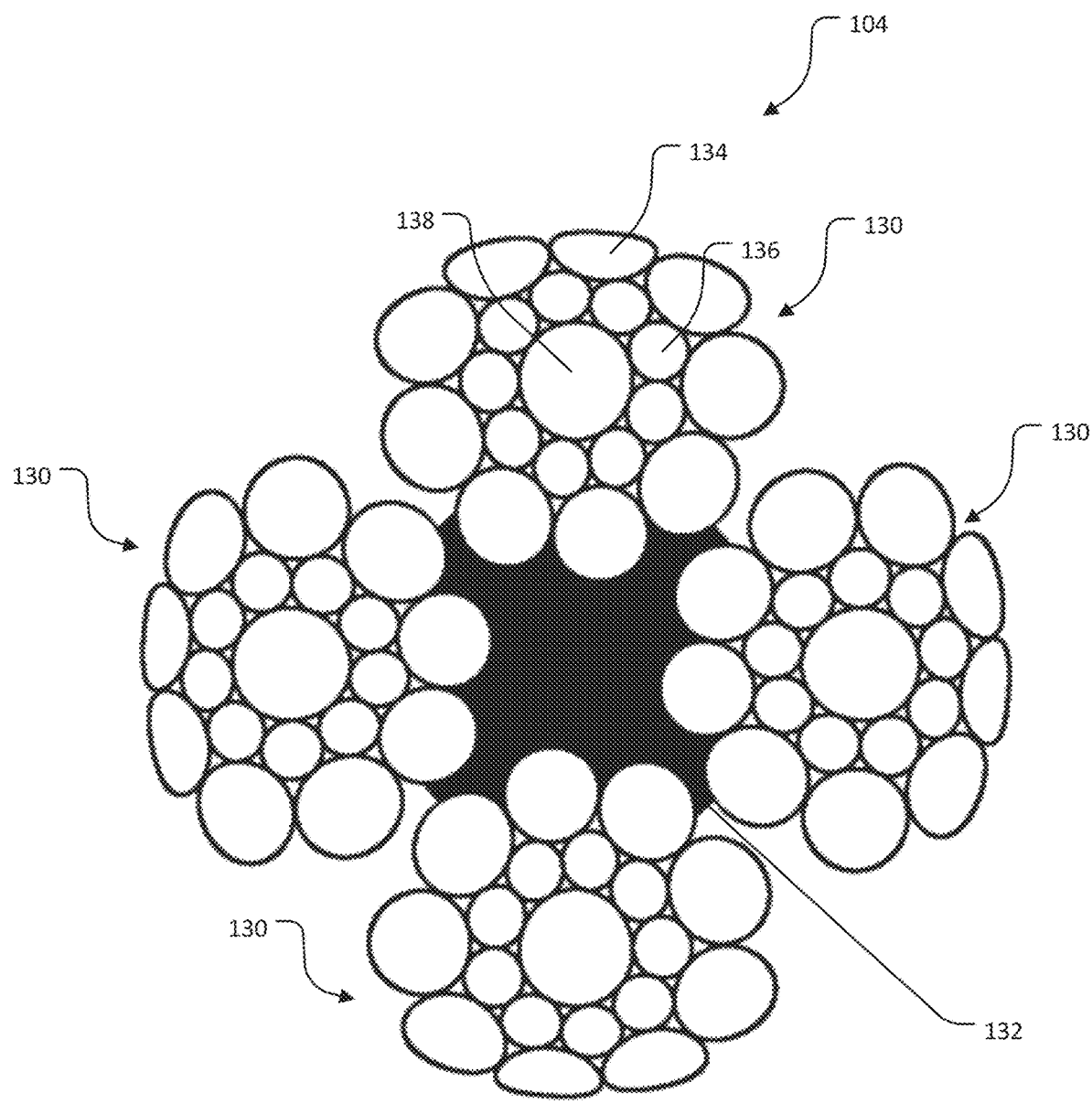
FIG. 1 illustrates an exploded end view of a wire rope cable according to an aspect of the disclosure.

The disclosure will now be described with reference to the drawing figures, in which like reference numerals refer to like parts throughout. Aspects of the disclosure advantageously provide a hoist system having wire rope cable that is safer and requires less maintenance.

Figure 2:
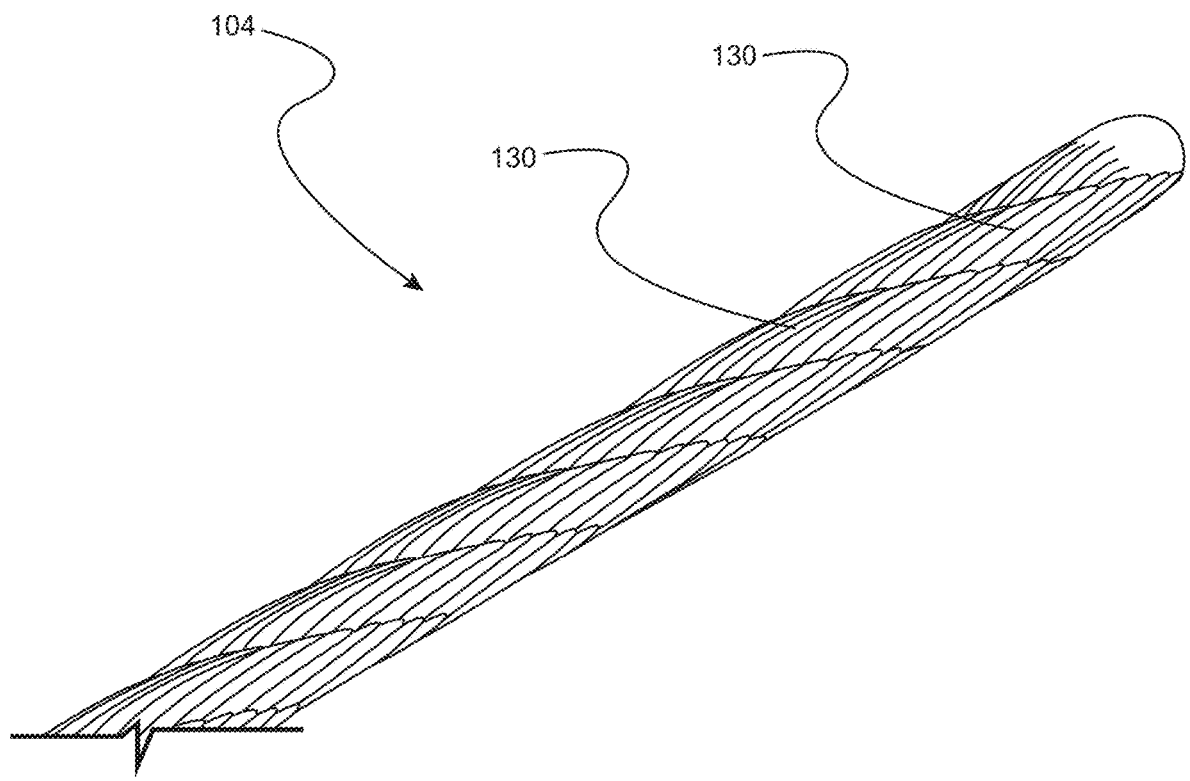
FIG. 2 illustrates a side view of the wire rope cable according to FIG. 1.
Figure 3:
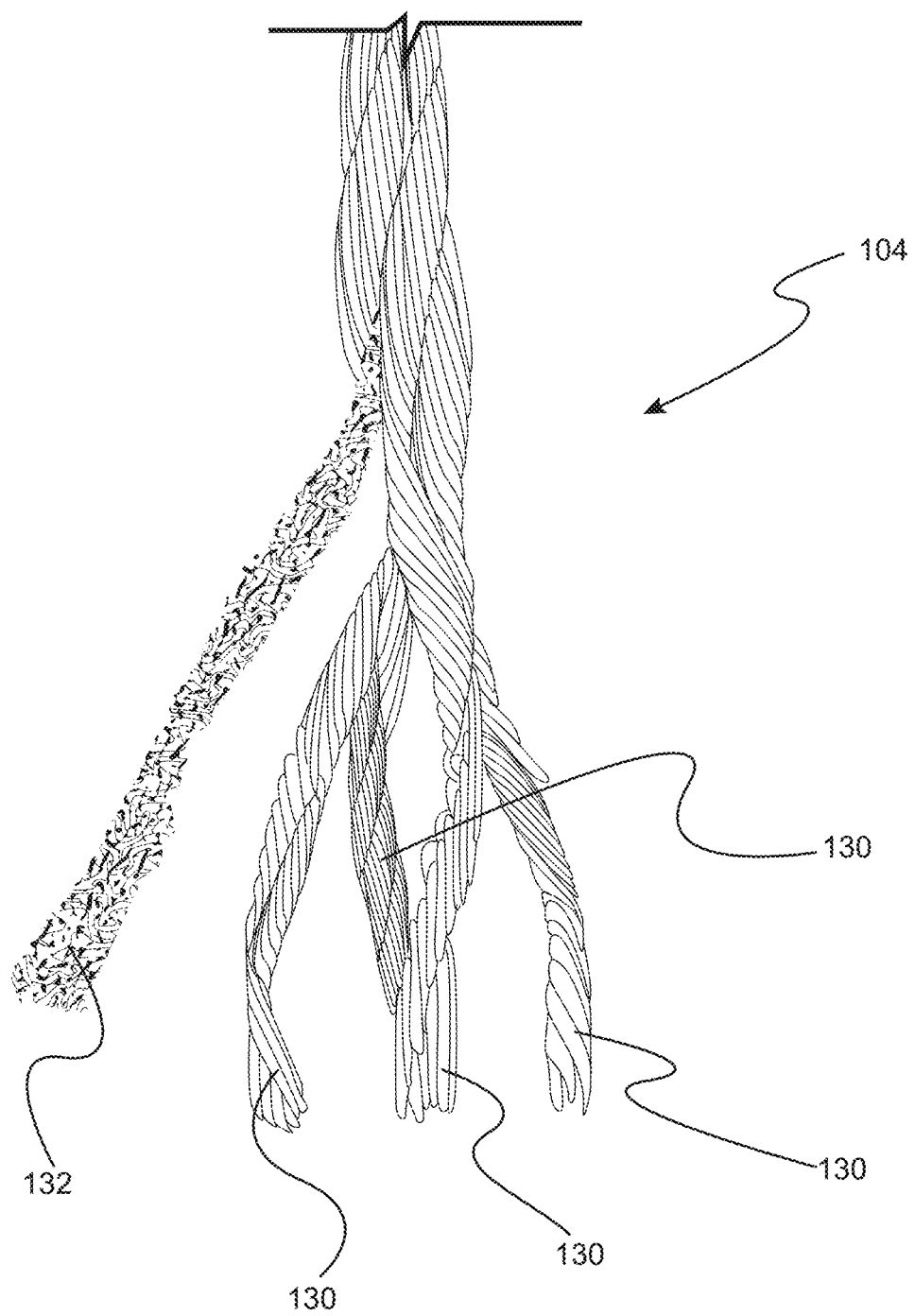
FIG. 3 illustrates an exploded side view of an end of the wire rope cable according to FIG. 1.

FIG. 1 illustrates an exploded end view of the wire rope cable according to an aspect of the disclosure; FIG. 2 illustrates a side view of the wire rope cable according to FIG. 1; and FIG. 3 illustrates an exploded side view of an end of the wire rope cable according to FIG. 1. In particular, FIG. 1 illustrates a wire rope cable 104 that includes a plurality of strands 130. In one aspect, the wire rope cable 104 includes four strands 130. The strands 130 may be assembled in a helix. In one aspect, a process of forming the helix may include a process referred to as closing the wire rope.

In one aspect, the wire rope cable 104 includes a core 132. In one aspect, the core 132 may be formed of a synthetic material. In one aspect, the core 132 may be formed of a plastic material. The plastic material may include Polytetrafluoroethylene (PTFE), Nylon, Acetal, Silicone, Polyester, Polyethylene, Aramid strands, Fiberglass, synthetic organic compounds, semi-synthetic organic compounds, thermoplastics, thermosetting polymers, or a combination thereof. The plastic material may include stabilizers to suppress degradation that results from UV-light, oxidation, and other phenomena. The plastic material may include fillers, for example fillers having stabilizing additives that include fire retardants, to lower the flammability of the material. The plastic material may include plasticizers. In one aspect, the wire rope cable 104 does not include the core 132.

Each strand 130 may be composed of various wires, arranged in any particular pattern. Moreover, each strand 130 may be composed of any particular number of wires. In one aspect, a pattern of the wires may include various wire sizes within each strand 130. In one aspect, a pattern of the wires may include the same size wire sizes within each strand 130.

In one aspect, the wire rope cable 104 may include four strands 130, each with 19 wires, for a total of 76 wires. In one aspect, the strands 130 may be configured as right regular lay. In other aspects, the strands 130 may be configured as left regular lay. In one aspect, a length of lay of the wire rope cable 104 may not be less than 1.36 inch nor greater than 1.48 inch.

In one aspect, each strand 130 may include outer wires 134, inner wires 136, and a central wire 138. In one aspect, the outer wires 134 may be larger in diameter then the inner wires 136. In one aspect, the central wire 138 may be larger in diameter then the inner wires 136. In one aspect, the outer wires 134, the inner wires 136, and the central wire 138 may have a diameter of 1/32 inches to 3/32 inches.

In one aspect, the wires 134, 136, 138 of the strands 130 may be lightly and uniformly coated with a suitable friction-preventive, non-corrosive compound. In one aspect, the compound may be a lubricant. In one aspect, the lubricant may have a composition configured to operate at temperatures from −65° F. to 160° F. (−54° C. to 71° C.). However, the lubricant may have a composition configured to operate within other temperature ranges. In one aspect, the wire rope cable 104 may be compacted to a uniformly smooth outer surface circumference.

In one aspect, the wires 134, 136, 138 of the strands 130 may have a circular cross-section. In one aspect, the wires 134, 136, 138 of the strands 130 may have an oval cross-section. In one aspect, the wires 134, 136, 138 of the strands 130 may have a polygonal cross-section.

In one aspect, the wire rope cable 104 may include a tracer filament to identify the wire rope cable 104. In one aspect, the wire rope cable 104 may include a color tracer filament to identify a source of the wire rope cable 104. In one aspect, the wire rope cable 104 may painted, coated, etched, dyed, or otherwise marked to indicate end of travel zones or for any other particular reason.

In one aspect, the outer wires 134, the inner wires 136, and the central wire 138 may be formed of a metal. In one aspect, the outer wires 134, the inner wires 136, and the central wire 138 may be formed of steel. In one aspect, the outer wires 134, the inner wires 136, and the central wire 138 may be formed of stainless steel. In one aspect, the outer wires 134, the inner wires 136, and the central wire 138 may be formed of galvanized steel. In one aspect, the outer wires 134, the inner wires 136, and the central wire 138 may be formed of AISI 304 corrosion resistant steel. In one aspect, the outer wires 134, the inner wires 136, and the central wire 138 may be formed of AISI 302 corrosion resistant steel.

In one aspect, the wire rope cable 104 may be connected on one end to a hoist mechanism, with the other end connected using a permanent termination on the cable to a hook assembly. Various types of cable terminations may include the use of mechanically swaged end fittings, spliced fittings, knotted terminations, welded terminations, and the like.

In one aspect, each strand 130 may include nine of the outer wires 134. In other aspects, each strand 130 may include any number of the outer wires 134. In one aspect, each strand 130 may include nine of the inner wires 136. In other aspects, each strand 130 may include any number of the inner wires 136. In one aspect, each strand 130 may include a single one of the central wire 138. In other aspects, each strand 130 may include any number of the central wires 138.

In one aspect, the wire rope cable 104 may include a plurality of strands 130. Each strand 130 may surround and contact a single core 132 such that the plurality of strands 134 may form an external surface of the wire rope cable 104 as well as contact the single core 132. In other words, each strand 130 is an external strand and there are no internal strands.

In one aspect, the wire rope cable 104 may include a plurality of strands 130, each strand 130 may include the outer wires 134. The outer wires 134 may surround the inner wires 136. The inner wires 136 may surround a single one of the central wire 138; and the plurality of strands 130 may surround a single core 132.

In one aspect, the wire rope cable 104 may include four strands 130, each strand 130 may include nine of the outer wires 134, may include nine of the inner wires 136, and may include a single one of the central wire 138; and the wire rope cable 104 may include a single core 132. Accordingly, this aspect of the wire rope cable 104 results in a synergistic combination of components, materials, construction, and the like to result in a higher performance wire rope that further results in reduced maintenance costs and associated "downtime" that are chief drivers of customer satisfaction for operators of rotorcraft, which are equipped with hoists. Moreover, this aspect of the wire rope cable 104 provides greater safety due to higher strength, abrasion resistance, and shock handling capability. In this regard, the disclosed wire rope cable 104 provides reduced maintenance burden and increased safety relating to usage of hoists as installed on rotorcraft.

In one aspect, the wire rope cable 104 may be finished by mechanically compacting an exterior of the closed wire rope. In one aspect, this compaction may be performed by various manufacturing techniques. The compaction allows control of wrapping and fitment within a rotorcraft mounted hoist.

In one aspect, the wire rope cable 104 may have a nominal diameter of 0.1 inches to 0.25 inches. In one aspect, the wire rope cable 104 may have a nominal diameter of 0.15 inches to 0.2 inches. In one aspect, the wire rope cable 104 may have a nominal diameter of 0.18 inches to 0.19 inches.

In one aspect, the wire rope cable 104 may be configured to have the dimensions and physical properties consistent with table 1 listed below:

TABLE 1

| Dimensions and Physical Properties | | | | | | |
|---|---|---|---|---|---|---|
| Nominal Diameter (inch) | Minimum Diameter (inch) | Maximum Diameter (inch) | Allowable Diameter Increase at Unseized End (inch) | Minimum Breaking Strength (lbf) | Proof Load (lbf) | Weight Per 1000 feet (lbm) ± 5% |
| 3/16 | 0.186 | 0.189 | 0.019 | 3,330 | 2,000 | 68.0 |

FIG. 2 illustrates an exemplary four wire rope cable 104 constructed in accordance with the disclosure. As can be seen in FIG. 2, the wire rope cable 104 has been subjected to compaction that smooths the wire rope cable 104 and provides improved fitment.

Figure 4:
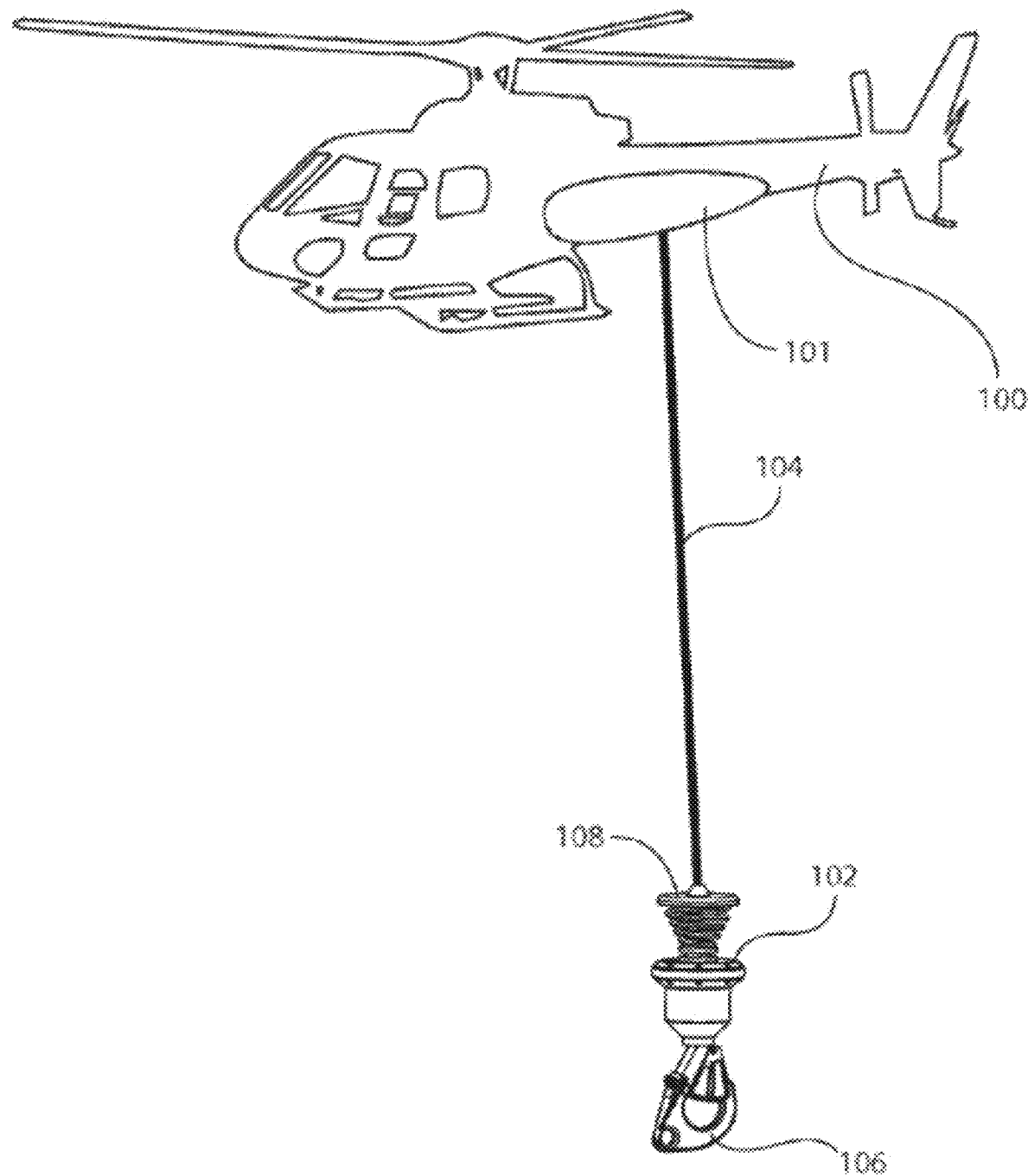
FIG. 4 shows a helicopter with an exemplary helicopter-hoist system according to an aspect of the disclosure.

FIG. 4 shows a helicopter with an exemplary helicopter-hoist system according to an aspect of the disclosure. In particular, FIG. 4 shows a helicopter 100 with an exemplary aircraft hoist system 101, which may be used for search and rescue missions. As shown in FIG. 4, the aircraft hoist system 101 may be positioned on an upper side of the aircraft, and may be attached directly or indirectly to the helicopter 100.

Although FIG. 4 depicts a rescue helicopter as the aircraft hoist system 101, the associated principles/methodologies described herein are not limited to rescue helicopters, and may be applied to any airborne platform capable of hovering. For example, the aircraft hoist system 101 may be attached directly or indirectly to a cargo helicopter (not shown), tilt rotor aircraft, and the like and may be mounted underneath an aircraft's fuselage. The aircraft hoist system 101 may also be coupled to an autonomous or remote controlled aircraft, such as an unmanned aerial vehicle, and unmanned aircraft system (UAV/UAS), and the like.

Referring to FIG. 4, the aircraft hoist system 101 may include a smart-hook 102 and the wire rope cable 104. The smart-hook 102 may be positioned between the wire rope cable 104 and a hook 106. That is, the smart-hook 102 may be connected to the wire rope cable 104 at its upper end, and connected to the hook 106 (or other rescue object) on its lower end. As appreciated by one skilled in the art with the benefit of this disclosure, the smart-hook 102 may be connected directly or indirectly to the wire rope cable 104 and the hook 106. For instance, as shown in FIG. 4, a spring-interface device 108 may be connected between the wire rope cable 104 and the smart-hook 102. In other aspects of the hoist system, the wire rope cable 104 may be connected to the hook 106 directly and not include a smart-hook 102.

Figure 5:
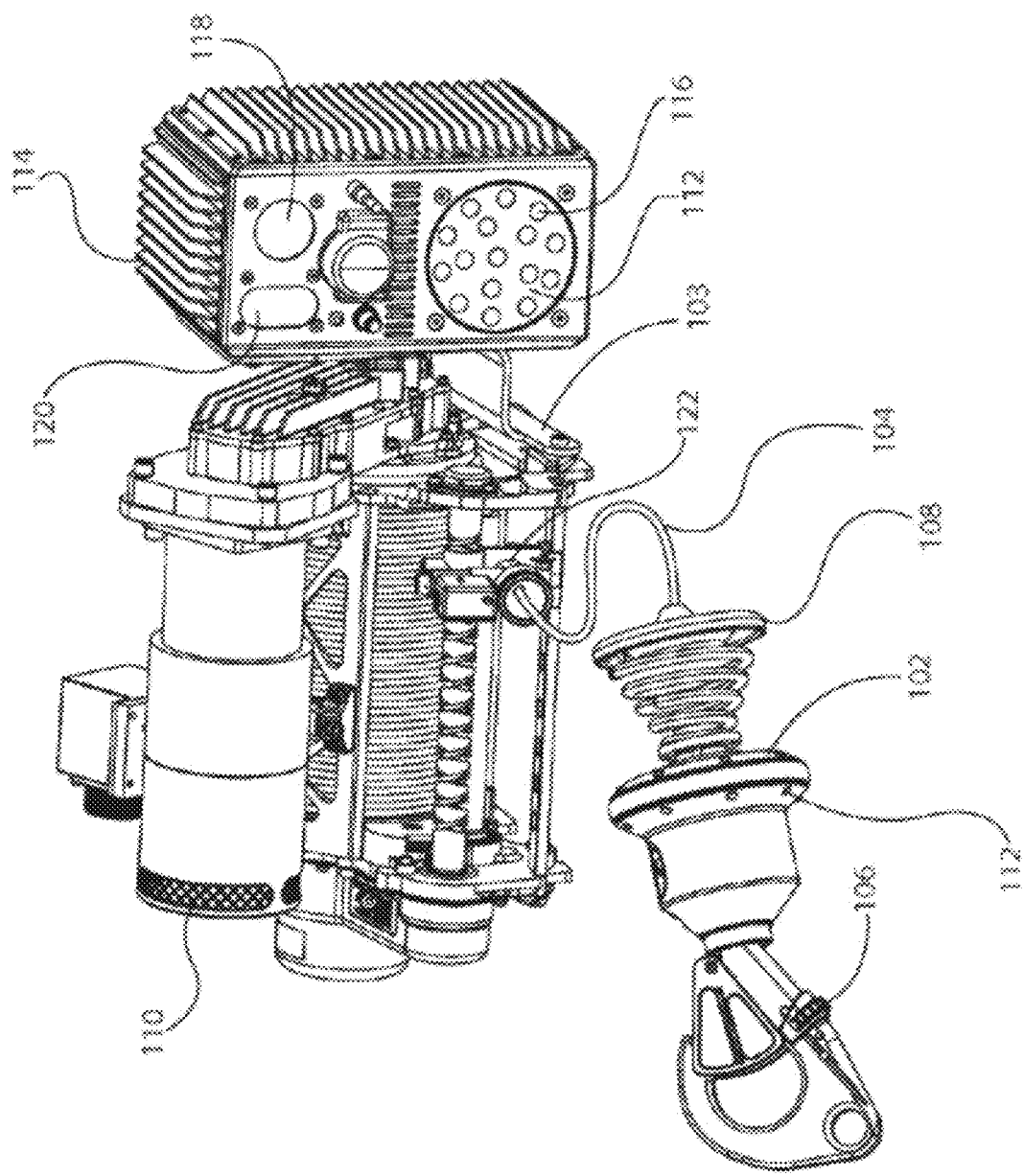
FIG. 5 illustrates an independent and enlarged view of the helicopter-hoist system shown in FIG. 4.

FIG. 5 illustrates an enlarged view of the aircraft hoist system 101 shown in FIG. 4, with the wire rope cable 104 in a generally retracted position. The aircraft hoist system 101 may include a frame 103 on which the hoist equipment (i.e., the wire rope cable 104, the smart-hook 102, and a motor 110), and an electronic housing 114 are mounted. The electronic housing 114 may include lighting, lasers, cameras, communication equipment, electronics, processing equipment, and/or the like.

The aircraft hoist system 101 may include the motor 110. In one example, the motor 110 may be a brushless motor, which may provide smoother raising and lowering of the wire rope cable 104. In another aspect, the motor 110 may include a high-performance variable-speed brushless permanent magnet rotary servomotor, with Universal AC or DC power input. Torque output may range between 5.6 Nm and 13.9 Nm. As appreciated by those skilled in the art, the exact torque range may vary and may be less than or more than 5.6 Nm and 13.9 Nm. In addition, any suitable motor or motors may be used as part of the hoist equipment.

The aircraft hoist system 101 may include a lifting mechanism that may include a rotating drum, a set of frictional rollers, and/or the like connected to a length of the wire rope cable 104, which is terminated at its lower end to a hook 106. The lifting mechanism may be configured to rotate to lift or lower the wire rope cable 104.

The aircraft hoist system 101 may include illumination systems 112. In one aspect, the illumination systems 112 may be located on both the smart-hook 102 and the electronic housing 114. The illumination system 112 may be provided on the electronic housing 114 may include high-intensity lighting 116, such as LED spotlights, for illuminating the wire rope cable 104, the smart-hook 102, the rescue scene, the cargo area, and/or the like, thereby improving the safety and efficiency of a rescue mission or cargo operation. The high-intensity lighting 116 may include spotlight on-off capability, and adjustable illumination intensity. In another example, the lighting 116 (or other lighting attached to the aircraft hoist system 101) may include infrared LED lights for covert illumination of a target rescue or cargo area.

The aircraft hoist system 101 may also include a camera(s) 118 for recording a scene (such as cargo or rescue target area) during the day or at night. The camera(s) 118 may include camera-stabilization technology. Although shown as part of electronic housing 114 in FIG. 5, the camera(s) 118 may be mounted inside or outside the helicopter to record a target area underneath the helicopter, such as a hook location or a target rescue area. The camera(s) 118 may generate real-time-streaming video feeds that are relayed to a control system. For instance, the video may include pictures of the cable, the rescue hook, and the rescue scene or cargo area below the hook and cable.

The aircraft hoist system 101 may also include range-measuring equipment (such as a laser-range finder) 120 for determining the distance of the smart-hook 102 from the helicopter 100, and as well as the distance of objects or ground/water from helicopter 100.

The aircraft hoist system 101 may also include, a cable-payout and direction detector 122, which measures the distance the wire rope cable 104 is extended and a direction the wire rope cable 104 is moving (i.e., up or down).

Figure 6:
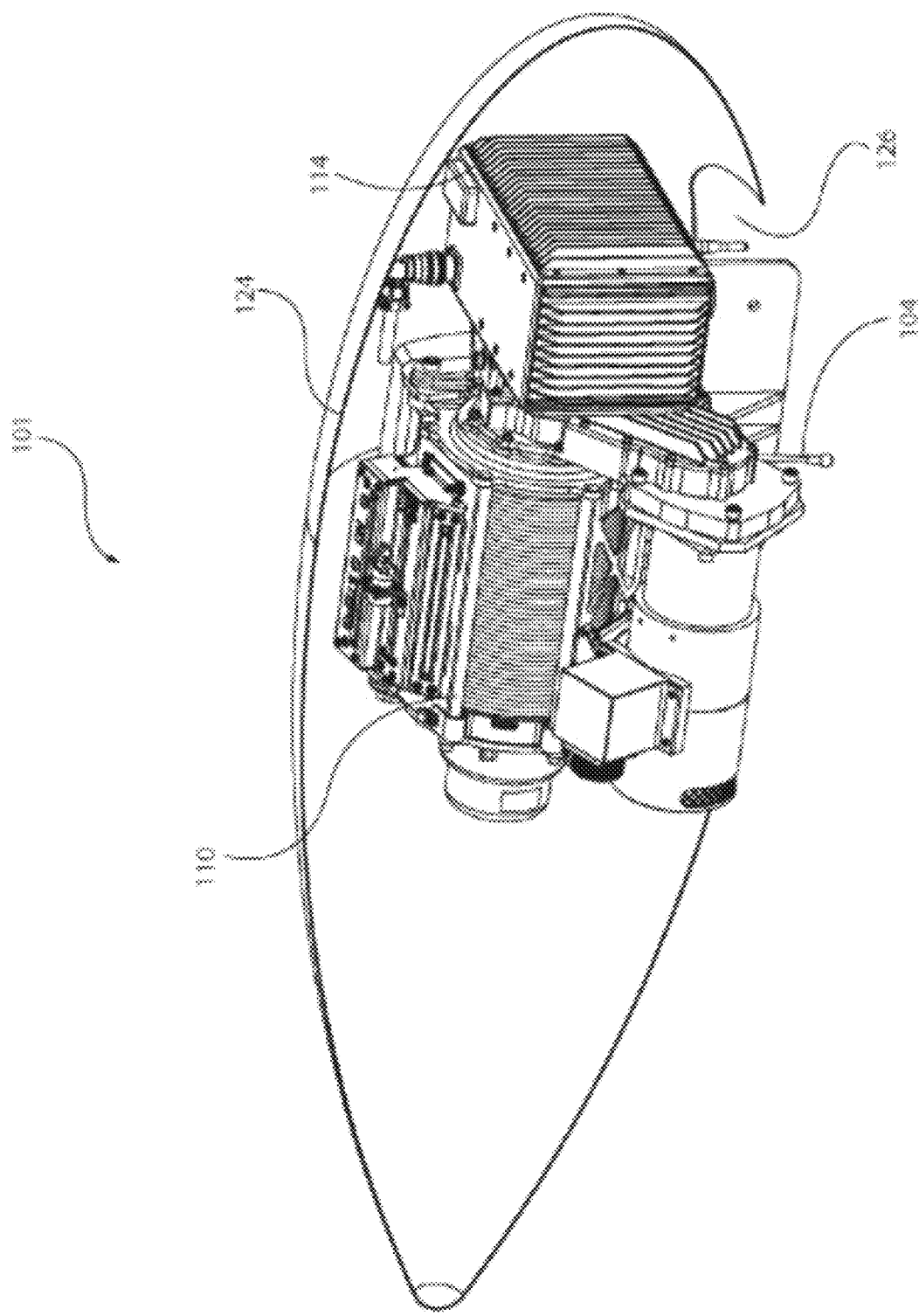
FIG. 6 depicts a side view of a helicopter-hoist system mounted and encased within a cowling according to an aspect of the disclosure.

FIG. 6 depicts a side view of helicopter-hoist system mounted and encased within a cowling according to an aspect of the disclosure. The aircraft hoist system 101 may be mounted and fully integrated in a cowling. For instance, FIG. 6 depicts a transparent view of helicopter-hoist system (shown in FIGS. 4 and 5) mounted and encased in a cowling 124. In one example, the cowling 124 is aerodynamically shaped (cylindrical or torpedo shaped with conical ends), and is comprised of any suitable water resistant material, such as but not limited to plastic, metal, aluminum, carbon fiber, polycarbonate, and any combination of the foregoing. The cowling 124 may be configured of other suitable shapes, colors, and sizes. In addition, although the hoist and electronic equipment are housed as an integrated unit in the cowling 124, it is possible that these units may be apart and positioned in different areas of a helicopter.

The cowling 124 may be mounted inside or outside a helicopter. For example, the cowling 124 may be mounted directly or indirectly to the fuselage of helicopter 100. The cowling 124 may have openings 126 to allow ingress and egress of the wire rope cable 104, as well as the ability to transmit and receive light and images via optical systems (i.e., lasers, cameras, lights, etc.) resident on the electronic housing 114.

Figure 7:
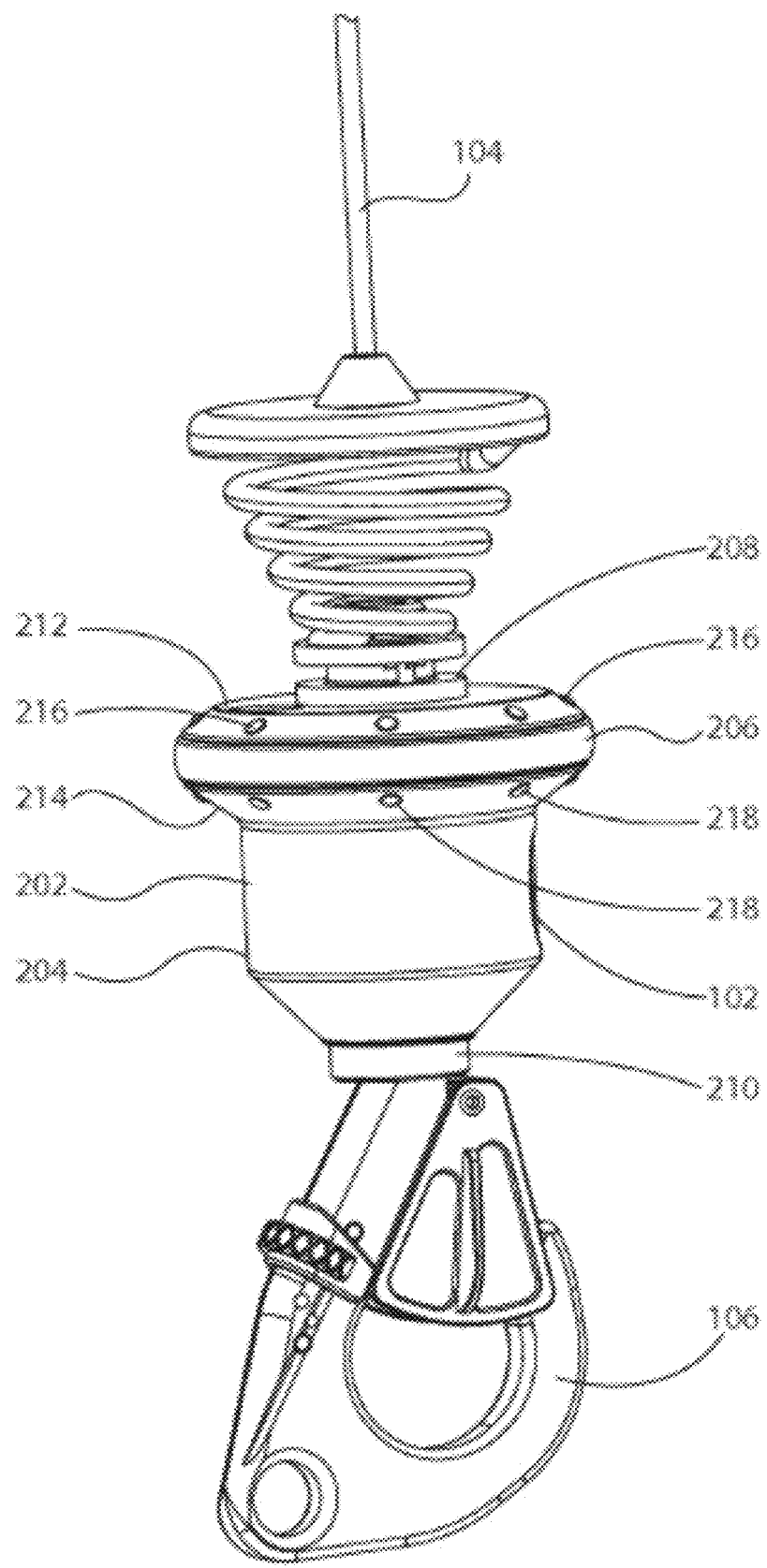
FIG. 7 shows a further enlarged view of a smart-hook apparatus depicted in FIG. 5.

FIG. 7 shows a further enlarged view of the smart-hook apparatus depicted in FIG. 5. FIG. 7 shows a further enlarged view of smart-hook 102 of the aircraft hoist system 101 shown in FIGS. 4 and 5. The smart-hook 102 includes a housing 202 with an outer surface 204. The outer surface 204 may include any suitable waterproof material, such as aluminum, plastic, fiberglass, or polycarbonate. Further, the outer surface 204 may be configured into any suitable shape and color(s). In addition, the housing 202 may be configured to be submersible in water, and may be configured to be submerged in excess of 20 feet under water.

For instance, in one example, the shape of outer surface 204 includes a ring 206 coaxially protruding from the housing 202. As shown in FIG. 7, the ring 206 is located between cable end 208 and the hook end 210 of housing 202. In this example, the ring has an upper surface 212 generally facing the cable and 208, and a lower surface 214 facing the hook end 210. The position of the ring 206 may vary. In addition, as appreciated by those skilled in the art with the benefit of this disclosure, the ring 206 may be of different shapes, configurations, and dimensions, and is not limited to cylindrical shapes.

A first plurality of lights 216 are mounted on upper surface 212 of the ring 206 configured to generally illuminate light upward and toward a helicopter when the hook 106 is lowered from a helicopter. Alternatively, in another example, a single set of lights may be mounted at the edge of the ring 206, so they can be seen from both below and above the ring 206.

A second plurality of lights 218 may be mounted on the lower surface 214 of ring 206 configured to illuminate light downward and generally in a direction away from a helicopter when the hook end 210 is lowered from a helicopter (such as helicopter 100 FIG. 4). Thus, lights 216, 218 are visible from the side, above and/or below smart-hook 102.

Lights 216, 218 may be light emitting diodes (LEDs) and/or or other types of lights (including lasers) as would be appreciated by one of skilled in the art. Lights 216, 218 may include white lighting, and colored lights (such as green, red, yellow or other suitable colors). Lights 216, 218 may also include stealth-lighting capability such as infrared lights. For example, lights 216, 218 may be compatible with night-vision goggles (NVG) or other night vision systems, but generally be undetectable to the unaided-human eye.

The cable end 208 may include a threaded connector for coupling the smart-hook 102 directly or indirectly to a wire rope cable 104. Although shown as a threaded connector, other connector technology may be used such as a snap-in connector.

Figure 8:
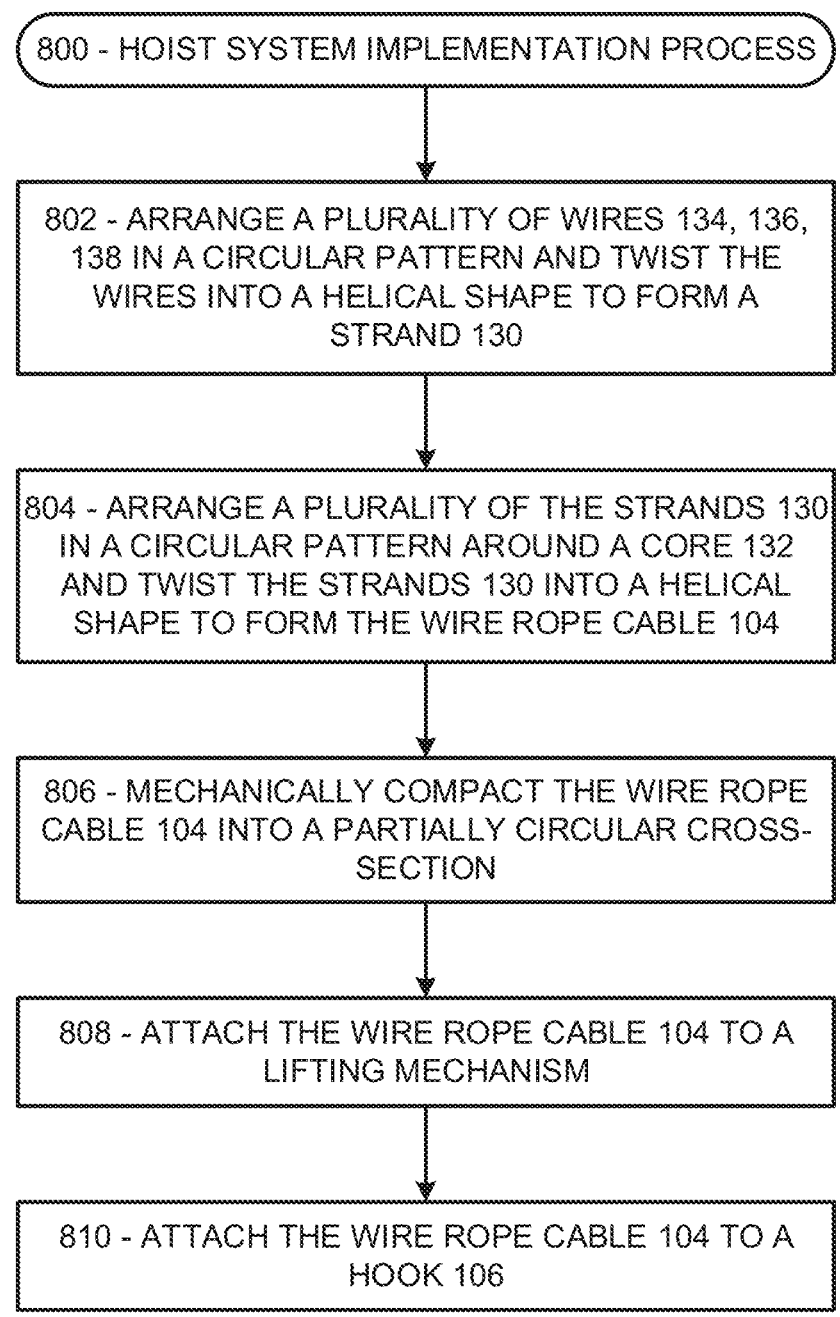
FIG. 8 illustrates a process of implementing a hoist system according to one aspect of the disclosure.

FIG. 8 illustrates a process of implementing a hoist system according to one aspect of the disclosure. The disclosed hoist system may also be associated with an implementation process 800. The process of implementing the aircraft hoist system 101 may include arranging a plurality of wires 134, 136, 138 in a circular pattern and twisting the wires into a helical shape to form a strand 130 as shown in box 802. The process of implementing the aircraft hoist system 101 may include arranging the plurality of strands 130 in a circular pattern and twisting the strands 130 into a helical shape to form the wire rope cable 104. Alternatively, the process of implementing the aircraft hoist system 101 may include arranging a plurality of the strands 130 in a circular pattern around a core 132 and twisting the strands 130 into a helical shape to form the wire rope cable 104 as shown in box 804.

The process of implementing the aircraft hoist system 101 may further include mechanically compacting the wire rope into a partially circular cross-section as shown in box 806. The process of implementing the aircraft hoist system 101 may further include adding terminations to cable ends. Various types of cable terminations may include the use of mechanically swaged end fittings, spliced fittings, knotted terminations, welded terminations, and the like.

In one aspect, one end of the wire rope cable 104 may be terminated with a swaged ball fitting. In particular, the wire rope cable 104 may be mechanically cut using shears or equivalent tooling. The cut end of the wire rope cable 104 may be swaged by uniformly cold-working the terminal via rotary hammer swaging until its dimensions conform to the appropriate dimensions.

In one aspect, one end of the wire rope cable 104 may be terminated with a welded end. In particular, the wire rope cable 104 may be mechanically cut using shears or equivalent tooling. The cut end of the wire rope cable 104 may be placed in a fixture and MIG point welded using, for example, an austenitic stainless steel welding wire.

The process of implementing the aircraft hoist system 101 may further include adding painted or otherwise marked zones to the cable exterior. In one aspect, the wire rope cable 104 may painted, coated, etched, dyed, or otherwise marked to indicate end of travel zones or for any other particular reason.

The process of implementing the aircraft hoist system 101 may include attaching the wire rope cable 104 to a lifting mechanism as shown in box 808. In one aspect, this process further includes forming a termination on one end of the wire rope cable 104 for attachment to the lifting mechanism.

The process of implementing the aircraft hoist system 101 may further include attaching the wire rope cable 104 to a hook 106 as shown in box 810. In one aspect, this process further includes forming a termination on another end of the wire rope cable 104 for attachment to the hook. Additional process steps may be utilized consistent with the disclosure.

In general, customers consider a rescue hoist cable's performance as a measure of the number of lifts performed prior to damage and cable scrapping. In general, the maximum number of lifts of a prior art rescue cable can support prior to replacement is 1500 lifts. Due to various reasons, current users of the prior art cable types obtain cable life generally in the 500 or less lift range. This results in increased cost due to cable replacement, conditioning, and other management. The high maintenance burden relating to existing cable designs tend to decrease customer trust in the product, leading to reduced usage of the product, and decreased training related to safe usage of the product.

The disclosed system and process include a synergistic combination of components, materials, construction, and the like to result in a higher performance system. The disclosed system results in reduced maintenance costs and associated "down-time" that are chief drivers of customer satisfaction for operators of rotorcraft, which are equipped with hoists. The disclosure offers customers increased confidence and safety due to higher strength, abrasion resistance, and shock handling capability. In this regard, the disclosed wire rope cable provides reduced maintenance burden and increased safety relating to usage of hoists as installed on rotorcraft.

The many features and advantages of the disclosure are apparent from the detailed specification, and, thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A hoist system, comprising:
   a wire rope cable having a first end and a second end;
   the wire rope cable further comprising a core;
   the wire rope cable further comprising multiple strands
      twisted into a helical shape around the core such that the multiple strands form an external surface of the wire rope cable and also contact the core;

a lifting mechanism configured to attach to the first end of the wire rope cable;

the lifting mechanism comprising at least one of the following: a rotating drum and a set of frictional rollers;

a motor configured to rotate the lifting mechanism; and a housing configured to house the lifting mechanism, the motor, and at least part of the wire rope cable; wherein the wire rope cable further comprises a marked portion to indicate an end of a travel zone comprising at least one of the following:

a painted portion, a coated portion, an etched portion, or a dyed portion.

2. The hoist system according to claim 1 wherein the multiple strands comprise four strands.

3. The hoist system according to claim 1 wherein the multiple strands comprise steel.

4. The hoist system according to claim 1 wherein the multiple strands comprise AISI 304 corrosion resistant steel.

5. The hoist system according to claim 1 wherein each strand includes nine outer wires.

6. The hoist system according to claim 1 wherein each strand includes nine inner wires.

7. The hoist system according to claim 1 wherein each strand includes a single central wire.

8. The hoist system according to claim 1 wherein the multiple strands comprise AISI 302 corrosion resistant steel.

9. The hoist system according to claim 1
wherein the multiple strands comprise four strands;
wherein the multiple strands comprise steel;
wherein each strand includes nine outer wires;
wherein each strand includes nine inner wires; and
wherein each strand includes a single central wire.

10. A hoist system, comprising:
a wire rope cable having a first end and a second end;
the wire rope cable further comprising a core that comprises a synthetic material;
the wire rope cable further comprising multiple strands twisted into a helical shape around the core such that the multiple strands form an external surface of the wire rope cable and also contact the core;

a lifting mechanism configured to attach to the first end of the wire rope cable;

the lifting mechanism comprising at least one of the following: a rotating drum and a set of frictional rollers;

a motor configured to rotate the lifting mechanism; and a housing configured to house the lifting mechanism, the motor, and at least part of the wire rope cable; wherein the wire rope cable further comprises a marked portion to indicate an end of a travel zone comprising at least one of the following:

a painted portion, a coated portion, an etched portion, or a dyed portion.

11. The hoist system according to claim 10 wherein the multiple strands comprise four strands.

12. The hoist system according to claim 10 wherein the multiple strands comprise steel.

13. The hoist system according to claim 10 wherein the multiple strands comprise AISI 304 corrosion resistant steel.

14. The hoist system according to claim 10 wherein each strand includes nine outer wires.

15. The hoist system according to claim 10 wherein each strand includes nine inner wires.

16. The hoist system according to claim 10 wherein each strand includes a single central wire.

17. The hoist system according to claim 10 wherein the multiple strands comprise AISI 302 corrosion resistant steel.

18. The hoist system according to claim 10
wherein the multiple strands comprise four strands;
wherein the multiple strands comprise steel;
wherein each strand includes nine outer wires;
wherein each strand includes nine inner wires; and
wherein each strand includes a single central wire.

* * * * *